(12) United States Patent
Löbig (10) Patent No.: US 7,420,928 B2
(45) Date of Patent: Sep. 2, 2008

(54) TESTING OF TRANSMISSION QUALITY IN PACKET-BASED NETWORKS

(75) Inventor: Norbert Löbig, Darmstadt (DE)

(73) Assignee: Siemens Aktiengesellschaft, Munich (DE)

( * ) Notice: Subject to any disclaimer, the term of this patent is extended or adjusted under 35 U.S.C. 154(b) by 626 days.

(21) Appl. No.: 10/519,868

(22) PCT Filed: Jun. 30, 2003

(86) PCT No.: PCT/DE03/02167

§ 371 (c)(1),
(2), (4) Date: Dec. 30, 2004

(87) PCT Pub. No.: WO2004/006504

PCT Pub. Date: Jan. 15, 2004

(65) Prior Publication Data

US 2005/0261860 A1 Nov. 24, 2005

(30) Foreign Application Priority Data

Jul. 2, 2002 (DE) ............................. 102 29 679

(51) Int. Cl.
*G06F 11/00* (2006.01)
*G01R 31/08* (2006.01)
(52) U.S. Cl. ..................................... 370/248; 370/249
(58) Field of Classification Search ......... 370/241–250, 370/254; 709/223; 714/716–717
See application file for complete search history.

(56) References Cited

U.S. PATENT DOCUMENTS 5,563,875 A * 10/1996 Hefel et al. ................. 370/249

(Continued)

FOREIGN PATENT DOCUMENTS

EP 0 777 401 A1 6/1997

(Continued)

OTHER PUBLICATIONS

Satoru Ohta and Nobuo Fujii, "Applying OSI Systems Management Standards to Remotely Controlled Virtual Path Testing in ATM Networks", IEICE Transactions on Communications, Institute of Electronics Information and Comm. Eng., vol. E76-B, No. 3, Mar. 3, 1993, Tokyo, Japan, pp. 280-290.

*Primary Examiner*—Kwang B. Yao
*Assistant Examiner*—Tung Q Tran (57) ABSTRACT

The invention relates to the testing of transmission quality of transmission links in a packet network. According to the invention, the director and responder functionality are made available in a resource server of the packet network. In order to perform a quality test, a connection is set up between the resource server and at least one gateway and potentially between two gateways by a packet-oriented switching center. Test signals are transmitted by the resource server and, after being mirrored at one or two gateways, are transmitted back to the resource server. The broadcast test signals are evaluated for transmission-related reductions in quality, e.g. distortion and attenuation, and the results of this evaluation for different broadcast links are combined in order to obtain information concerning the transmission quality of individual partial links. The invention is advantageous in that it makes complicated and expensive test functions available on centralized resource servers. Since resource servers of this type are, for the most part, already provided for carrying out other functions in the packet network, e.g. IVR server, it is possible, as a rule, to make the test functionality available on existing servers.

15 Claims, 4 Drawing Sheets

U.S. PATENT DOCUMENTS

| | | | |
|---|---|---|---|
| 6,269,083 B1 * | 7/2001 | Nagata et al. | 370/248 |
| 6,700,953 B1 * | 3/2004 | Maurer et al. | 379/88.01 |
| 6,738,353 B2 * | 5/2004 | Chong | 370/241 |
| 2002/0159393 A1 * | 10/2002 | Smith et al. | 370/249 |
| 2002/0167936 A1 | 11/2002 | Goodman | |

FOREIGN PATENT DOCUMENTS

| | | |
|---|---|---|
| EP | 1 215 855 A2 | 6/2002 |
| WO | WO 02/51092 A2 | 6/2002 |

* cited by examiner

TESTING OF TRANSMISSION QUALITY IN PACKET-BASED NETWORKS

CROSS REFERENCE TO RELATED APPLICATIONS

This application is the US National Stage of International Application No. PCT/DE2003/002167, filed Jun. 30, 2003 and claims the benefit thereof. The International Application claims the benefits of German application No. 10229679.0 filed Jul. 2, 2002, both applications are incorporated by reference herein in their entirety.

FIELD OF THE INVENTION

The invention relates to a method, a resource server, a gateway and a system for testing the transmission quality in a packet network.

BACKGROUND OF THE INVENTION

The invention lies in the field of switching technology and deals with aspects of quality testing for data transmission over packet networks, for example IP (Internet Protocol)-based networks.

TMD (Time Division Multiplexing) networks provide a wide diversity of quality attributes, in particular for services with voice transmission, i.e. telephony. Guaranteeing these attributes requires regular testing or supervision of transmission links. As regards the convergence of TDM networks and packet-based networks, it is desirable to also guarantee the quality attributes known from TDM networks for packet networks and for the interworking of different network types. Above all, for voice-related services, compliance with quality attributes plays an important role in ensuring that demands such as real time transmission and adequate speech quality are met. Thus considerable development work is directed to providing quality attributes for voice transmission over IP networks. In this connection voice-over-IP, abbreviated to VoIP, is referred to.

SUMMARY OF THE INVENTION

Data or voice transmission over a packet-based network with quality attributes comparable to those of TDM networks requires the use of test resources and test procedures for checking the transmission quality.

With conventional Time Division Multiplex-based communication networks (TDM networks) which are designed for high quality operation, connection line maintenance and checking procedures are available which are provided by the switches present in the network or can be supported by these switches. These methods are used for fault detection, fault diagnosis and fault localization. They are based for a large part either on self-supervision mechanisms of the switch (e.g. irregularities of the signaling, ongoing events, permanently blocked, seized, unoccupied lines, end-to-end checks according to Standard ITU-T Q.724, Telephone user part signaling procedures, for #7 (Signaling System no. 7) signaled lines as part of the connection setup, PCM (Pulse Code Modulation) fault detection) or on test jobs for routine testing started via the operating devices for network or switch. Routine testing can be undertaken in accordance with a predefined test plan or schedule, if required with manual or automatic activation for a certain number of connecting lines of a switch. In this case the desired tests are specified in the test job and the test results are made available in a test report of the switching system at the operator interface.

Typically special devices are provided in the switching systems involved in the connecting line checks which—as initiator of a test—frequently referred to as a director in technical terms—are provided in a first switch and as a receiver or response device—frequently called a responder—are provided in a second switch.

When a connection is established over the connecting line to be tested which connects director and responder, a test sequence, generally linked to the exchange at signaling, can be started between director and responder. By looping back the information in the second or the remote switch the director and responder function can also lie for a connection line testing function in the first or initiating exchange. As a rule in the case of TDM networks the line testing is based on transmission of tones as well as the measurement of power and noise level and also of quality distortions, i.e. distortions caused by the scanning of signals in the course of a pulse code modulation. In the case of digital lines test patterns can also be transmitted. Using special workstations for connecting line testing, the switching system can additionally guarantee access to the connecting line to be tested, the opportunity for controlling tests and measurements and the option of listening in on the transmitted speech data or on the line to be tested by the operating personnel.

To provide corresponding or similar test and monitoring functions to those of TDM networks for packet-based networks the different architecture of packet-based networks and the switching differences must be taken into account. A typical scenario for voice transmission over packet-based networks is specified in FIG. 1.

Figure 1:
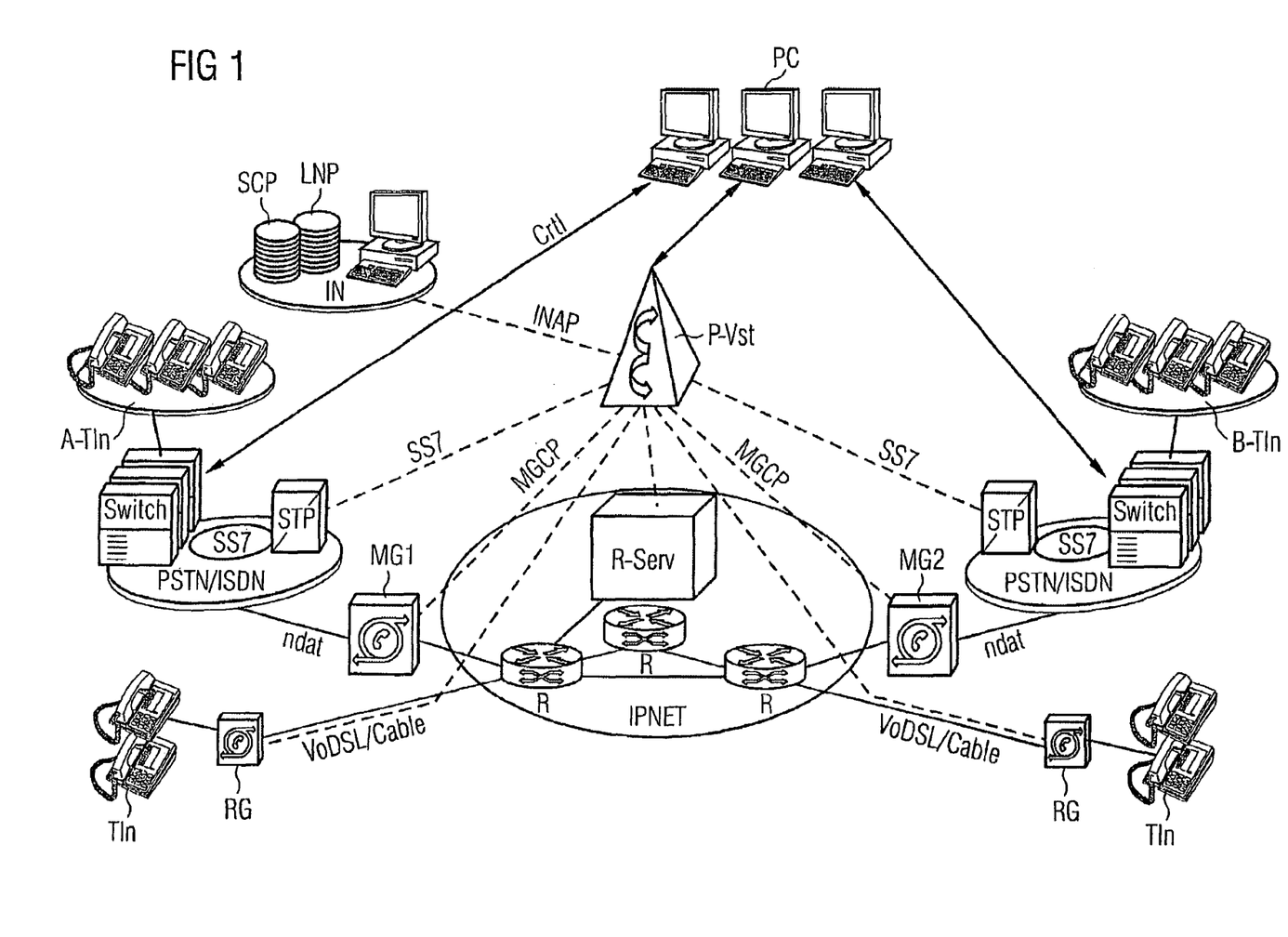
FIG. 1 shows a scenario for voice transmission over a packet-based network.

The scenario of FIG. 1 shows how subscribers connected to a TDM network PSTN/ISDN can exchange speech data over a packet-based network IPNET and what adaptations are required for this. The TDM network is for example a PSTN (Public Switched Telephone Network) to which subscribers A-Tln and B-Tln are connected, e.g. via an ISDN (integrated services digital network) access. Subscribers Tln can also exchange speech data over the packet network IPNET with terminals suitable for the packet network IPNET as well as with the aid of classical analog and ISDN terminals and private branch exchanges. These terminals frequently allow broadband data access to the packet-based network and additionally support the basic service features known from public telephone networks with the aid of protocols such as H.323 and SIP (compression initiation protocol), especially for the transmission of speech over packet networks. The obvious access media for the subscribers Tln as regards broadband access are subscriber access lines operated with suitable xDSL technologies (DSL: digital subscriber line) as well as the widely-used cable networks. This situation is expressed by the reference symbol VoDSL/cable through which the alternative use of a voice transmission over an xDSL connection (VoDSL: Voice over DSL) and cable access (Voice over Cable) in the access area are indicated. On the packet network side the access networks VoDSL/cable are as a rule terminated by adapters (not shown in the Figure). With the aid of these VoDSL/cable access networks broadband terminals (PCs with Internet access, televisions, video telephones) and also classical subscriber terminals, i.e. analog telephones, ISDN telephones, as well as analog and ISDN PABXs can be connected. For the access of terminating devices/terminals FIG. 1 shows subscriber access devices RG (RG: for residential gateway), also known as customer premises gateways. Typical examples of these types of access equipment are Integrated Access Devices IAD or Multimedia data Termination Adapters MTA at/in the cable modem.

For interworking of the time division multiplex-based networks PSTN/ISDN and the packet-based network IPNET both subscriber-related and also switching node side modifications are required. While the TDM-based switch has the task of call control and the termination and through switching of the payload channels, the packet-related exchange P-Vst retains the task of call control expanded by the task of control of the associated payload channels or payload data ndat routed outside the exchange P-Vst over external devices (e.g. gateways, resource servers, . . . ), which provide suitable interfaces for payload data streams (e.g. voice data transmission by means of the RTP (real time protocol) protocol) and signaling (e.g. with the aid of the MGCP (media gateway control protocols) protocol of the H.248 protocol or of the H.323 protocol).

Time division multiplex-based connecting lines to a classical (public or private) switch are terminated by a Media Gateway MG which is controlled by a packet-based network switch P-Vst. Classical subscriber lines and PABXs at a packet-based switch P-Vst are connected via what are known as Residential Gateways RG. The signaling is preferably routed packet-based to the packet-based switch P-Vst. The payload channel connections to be through connected by the packet-based switch P-Vst are routed outside the switch P-Vst without conversion to time division multiplexing, so that a direct payload data transfer ndat through the packet-based network IPNET is made possible as regards guaranteeing a high speech quality. Within the packet network IPNET payload data is forwarded by means of Routers R. Resource servers R-Serv placed in the packet network IPNET can in this case provide additional functions, e.g. 'IVR' (interactive voice response) functions. Signaling functions and control tasks for the packet network IPNET and the TDM network PSTN/ISDN are handled by the packet-based switch P-Vst. The packet-based switch P-Vst can be implemented for example by a conventional switch with additional modules for switching packet traffic. The signaling for TDM networks is executed by means of the SS7 (signaling system 7) protocol. SS7 signaling messages can be transmitted from the TDM network PSTN/ISDN to the packet-based network P-Vst and vice versa via a Signaling Transfer Point STP. The signaling between the packet-oriented switch P-Vst and various gateways, e.g. Media Gateways MG, Residential Gateways RG, is executed by means of the MGCP (Media Gateway Control Protocol). With the aid of terminals PC operator entries Crtl can be made and test data interrogated. Test functions and settings for the packet switch P-Vst can be included as part of the Intelligent Network IN concept. In this case a SCP (service control point) and LNP (local number portability) functionality are provided, with communication with the packet switch P-Vst being by means of the INAP (IN application part) protocol.

In view of these types of scenario of connections routed via a packet-oriented network as part of voice transmission for example connection line checking functions must be provided for packet-based transmission links.

To be functionally compatible with the TDM networks the packet-based switches P-Vst must support the concurrent line tests or those necessary on demand for their TDM lines. The connection paths in the packet network IPNET are not recorded by the test resources of the TDM network. The speech quality that they define can basically only be determined with the tone-based procedures available in the TDM area only in the specific case of tone-transparent coding procedures (e.g. according to Standards ITU-T G.711, Pulse Code Modulation (PCM) of voice frequencies, and ITU-T G.728, encoder of speech at 16 kbit/s using low-delay code excited linear prediction), which would however mean a non-practicable restriction for packet networks. In addition it has been shown that voice is relatively insensitive to the typical corruptions occurring in the packet network, such as packet loss and delay by comparison with pure data transmission, so that determining the transmission quality with tone-based techniques would not appear sensible in packet networks. Other procedures, which are however more complicated are available here (see ITU-T:P.861 (Perceptual Speech Quality Measurement, P.862 (Perceptual Evaluation of Speech Quality).

PC-based methods exist in which a plurality of external PCs access the packet network via gateways for test purposes. These allow data connections via the packet network to be checked and assessed as regards speech quality. An example of one such method is the ROTL (Remote Office Test Line) system. One disadvantage is the high costs of these devices arising in a network constructed with many gateways, the necessity of having to keep PC-based peripheral devices handy and the loss of transmission capacity associated with connecting said devices.

The object of the invention is to make possible efficient testing of packet network sections while avoiding the disadvantages of conventional methods.

This object is achieved by the claims.

The method in accordance with the invention comprises a packet-based switching system, a resource server and one or more gateways. The resource server is provided with a director or a responder functionality, with the resource server being able to send out test signals or test sequences (director functionality) and receive them back again (responder functionality). Optionally director and responder functionality can be implemented in different resource servers. The gateway or gateways include a loopback functionality. In this case loopback functionality is taken as the capability to direct the payload data stream coming out of the packet network back to the same bidirectional connection or the further transfer of the payload data to a further connection in the packet network. The invention allows the quality of the transmission over connecting links or connections to be checked in a packet network. Start and end point of a transmission link or part link to be checked here is for example specified by gateways or through the resource server and a gateway. The transmission quality of transmission links is checked with the aid of the transmission of test information, e.g. a test signal or a test sequence. This test information can be voice or tone information for example. This case can above all be of significance for the transmission quality of VoIP applications. It is also conceivable for a short video sequence to be transmitted.

Any equipment in the packet network provided with the loopback functionality defined above can be used as an end point of a part transmission link to be tested in the packet network. Examples are Media Gateways, Access Gateways, NAT (Network Access Translation) Routers etc. As a rule the packet network comprises subnetworks or packet network domains, which belong to different network operators for example, or use different network addressing with just local significance. Devices or subnetwork interworking devices which can support a loopback functionality in accordance with the invention are then used between such subnetworks, (a loopback can be undertaken in this case for example by an address modification in the packet header.) The term gateway is to be understood to include all types of device in the packet network or at the edge of the packet network which can be equipped with an inventive loopback functionality. The loopback functionality in the sense of a forward transmission or forwarding of the payload data to a further connection in the packet network can for example be implemented by a fixed connection of two ports of a gateway or a module of a gateway.

In general the checking is implemented by a resource server with director functionality sending test information which is reflected or looped back at at least one gateway and is finally transmitted to a resource server with responder functionality. In many cases it will be useful for the two resource servers with director or responder functionality to coincide, i.e. for the transmission path of the test information to be a closed loop. The transmission path of the test information can be selected so that a part link to be tested is connected. By transmitting test information over other paths and combination (e.g. subtraction) of the results, the part link to be tested can be isolated and the transmission quality on this part link determined. The transmission of the test information is controlled by at least one controller. For transmission of the test information over transmission links with gateways or resource servers which are not all controlled by the same controller more than one controller will be involved as a rule. Three methods which can for example be combined to test the transmission quality between two gateways, are illustrated below as an embodiment.

To check the quality attributes for the transmission of data between the resource server and a gateway a first inventive method is used. In the first method a connection between the resource server and a gateway is initiated or established by the packet-based switching system. The connection concerned is a bidirectional connection. A test signal or a test sequence is transmitted from the resource server to the gateway. In the gateway the test signal or the test sequence is looped back and transmitted back to the resource server from the same connection. Looping back here means transmission back on the same connection to the resource server. This can for example be implemented by a corresponding change of the packet header of data packets belonging to the test sequence or the test signal. Preferably the information is looped back after passing through all gateway functions (e.g. coding functions), that is close to the network side remote from the director, in order to also record the properties of the gateways themselves which adversely effect quality. As an alternative to one bidirectional connection, two bidirectional data connections between the resource server and the gateway can also be used. In this case the loopback functionality corresponds to the ability to forward data packets of a specific connection over another packet network connection. The test signals or test sequences received by the resource server can be compared with the original signals and thus checked for transmission errors and signal degradations. The processing of the test job and the logic for localization of possible error values, as well as the creation of a possible test report is preferably a facility to be provided by the resource server. Alternatively for example the fault analysis can also be undertaken in the packet-based exchange, but this leads to additional complexity. It therefore makes sense to provide an interface of the resource server for access to test desks of connecting line testing.

The transmission links between various gateways can be checked with the aid of a further method, called the second method below. In this method a connection setup between the resource server and a first gateway, a connection between the first gateway and a second gateway and also a connection between the second gateway and the resource server is undertaken by the switch. A test signal or a test sequence is then transmitted from the resource server to the first gateway, then from the first gateway to the second gateway and finally from the second gateway back to the resource server. An additional transmission of a test signal or a test sequence in the opposite direction via the same connections or additionally established connections can be performed to test the transmission quality in both directions. In the case of unsatisfactory transmission quality or a fault, the sublink causing the quality reduction or the transmission failure can be identified by combining the first method with the second. The first method allows the transmission quality on the transmission links between the resource server and the first and the second gateway to be checked, so that, if the quality is satisfactory on the part links between the resource server and the gateway, conclusions can be drawn about quality reductions or faults on the part link between the two gateways.

In accordance with a third method connections are initiated between the resource server and a first gateway as well as the first gateway and a second gateway of the packet-based switch. A test message or a test sequence is then transmitted from the resource server first to the first gateway and then from the first gateway to the second gateway. In the second gateway the test signal or the test sequence is looped back and transmitted back to the first gateway. From the first gateway the test signal or the test sequence is finally transmitted back to the resource server. The information can be transmitted on the same bidirectional or different unidirectional connections. In connection with the first method a check can be made for a fault or for a reduction in quality as to how much the individual part links between resource server and first gateway or first gateway and second gateway are contributing to the quality reduction or to the fault.

For the second and third method the first and the second gateways can be controlled by different packet-based switches. Such a scenario is shown as part of FIG. 2 discussed in the exemplary embodiment. In this case both packet-based switches can be involved in the connection setup between the first and second gateways as well as in the setup between the resource server and one of the two gateways. The ISUP (ISDN User Part) protocol will be used for example for communication between the packet-based switches. In this case it is also possible for director function and responder function to be implemented in two different resource servers which are controlled by different packet-oriented switches. With this arrangement the type of test information can either be transmitted directly between the two resource servers (e.g. using the directory number), or the test information is notified via test desks to the second resource server by means of operator entries.

The advantage of the invention is that the normally complicated and expensive test functions for checking the transmission quality, especially for evaluating the quality of the voice transmission, is provided on centralized resource servers. Such resource servers are usually present in packet-based networks in order to provide functionality and service features, e.g. Interactive-Voice-Response (IVR) functions or conference functions. Additional servers for checking the transmission quality can be provided, but thus do not have to be. It is more cost effective to provide the corresponding test functions on a resource server present in the network. Transmission links between gateways which are connected to the packet-based network, for example media gateways, residential gateways, access gateways and NAT routers, can be tested without complex functions having to be provided at the gateways. It is sufficient to ensure that the tested gateways have loopback functionality. Furthermore the loopback functionality can be restricted to some of the ports, as a rule virtual ports, of the gateways. The loopback functionality can also be implemented by TDM-side loops if not present directly in the gateways. The assessment of the speech quality of the connection between two gateways, for example media gateways, residential gateways and access gateways, is effected by excluding bad speech quality on the connection sections between the gateways and the centralized resource server, meaning that individual part strengths can be analyzed as regards quality by combining the methods in accordance with the invention.

The inventive methodology of placing director and responder functionality in resource servers and of broadcasting test information via gateways to which the test information is reflected or is diverted to another destination in the packet network is not restricted to transmission paths or round trip links with two gateways. In principle test information can be looped back or forwarded by any number of gateways before arriving at the responder. For statements about individual route sections the result of a transmission over a number of gateways can be combined with the result of tests in which one or two gateways are involved.

The invention is explained in more detail below within the framework of an exemplary embodiment on the basis of figures.

BRIEF DESCRIPTION OF THE DRAWINGS

In the Figures the same reference characters identify the same components.

DETAILED DESCRIPTION OF THE INVENTION

Figure 2:
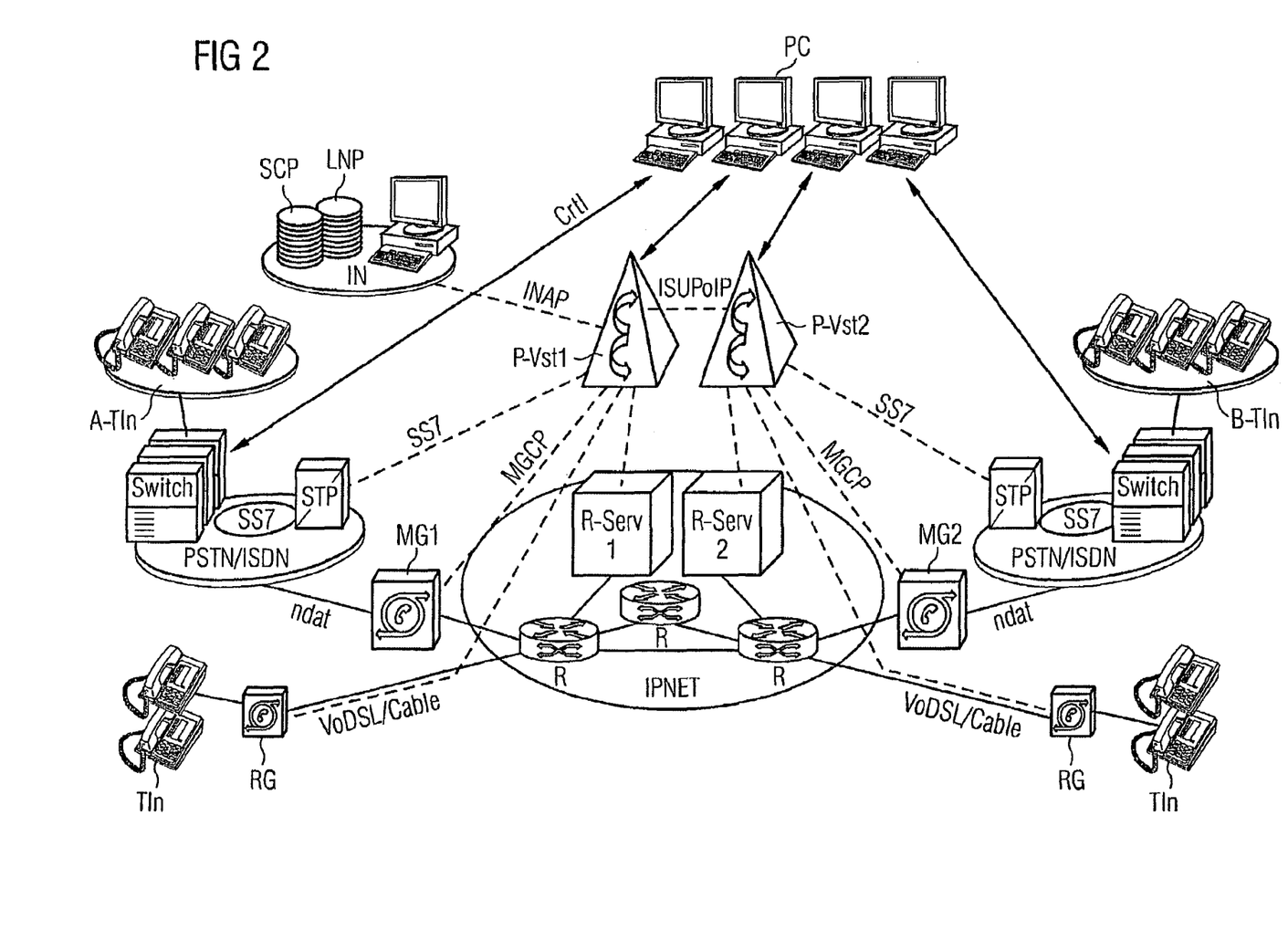
FIG. 2 shows a scenario for voice transmission over a packet-oriented network, in which two packet-oriented switches are used.

FIGS. 1 and 2 show typical network scenarios which occur on transmission of data, especially voice data. FIG. 2 differs from FIG. 1 dealt with in the introduction to the Description in that two packet-based switches P-Vst P-Vst1 and P-Vst2 are used for the transmission of voice data between subscriber A-Tln and subscriber B-Tln in the area of the packet network IPNET. Both switching systems P-Vst1 and P-Vst2 are assigned resource servers R-Serv1 or R-Serv2 which are positioned in the packet network IPNET. Signaling information is exchanged between the two switches P-Vst1 and P-Vst2 with the aid of the ISUP (ISDN User Part) protocol which can for example be transferred over the IP protocol (reference symbol ISUPoIP). In the area of responsibility of switches P-Vst1 and P-Vst2 there is a resource server R-Serv1 or R-Serv2 in each case. These servers are for example IVR servers. With packet-oriented switching systems at least one IVR servers is frequently provided for each switching system, in order if necessary to switch IVR functionalities through the packet-based switching system on a connection. The control interfaces between switching system and IVR servers or resource server are mostly IP-based and use the Media Gateway Control Protocol MGCP. A resource server of this type can be equipped with the inventive test functionality in addition to other functionalities, so that no additional platform needs to be provided for this purpose. For example in accordance with the invention the transmission link between the two media gateways MG1 and MG2 can be checked. This is done by initially checking the transmission links between the resource server R-Serv1 and the media gateway MG1 as well as between the resource server R-Serv2 and the media gateway MG2. As a next step test information is transmitted from the first resource server R-Serv1 to the first media gateway MG1, from the first media gateways MG1 to the second media gateway MG2 and finally from the second media gateway MG2 to the second resource server R-Serv2. Alternatively the test information can also be transmitted from the second media gateway back to the first resource server R-Serv1. Both packet-oriented switches P-Vst1 and P-Vst2 are involved in call control on transmission between the two media gateways. The transmission quality over the transmission link to be tested is determined using a combination of the results of the three transmissions of test information.

Figure 3:
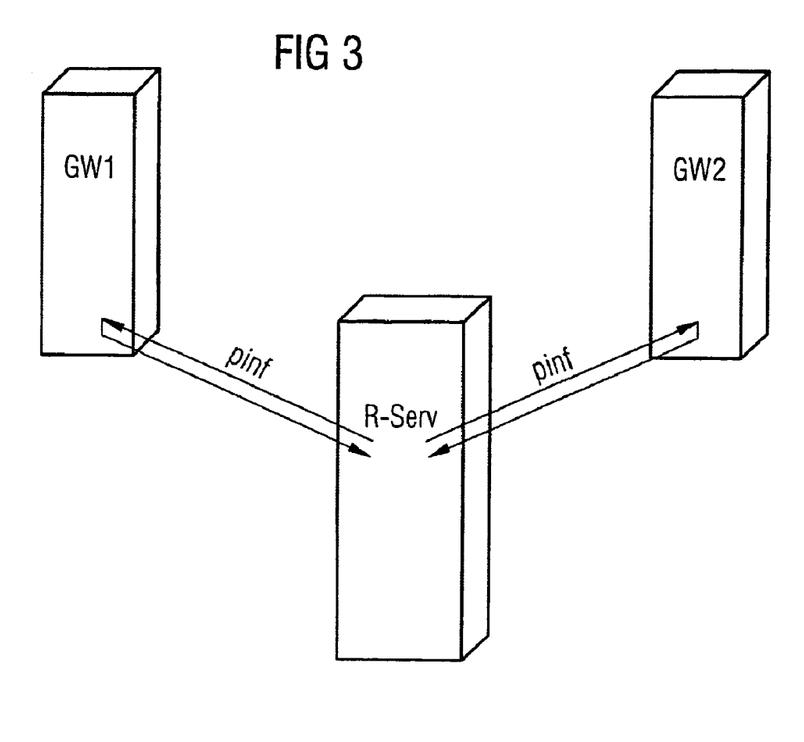
FIG. 3 shows a schematic diagram of the first inventive method.
Figure 4:
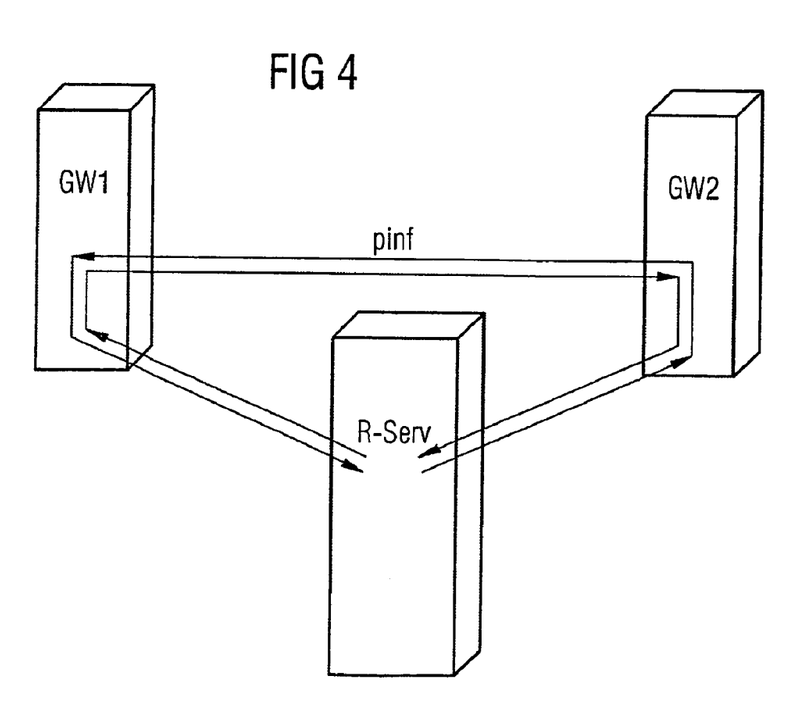
FIG. 4 shows a schematic diagram of the second inventive method.
Figure 5:
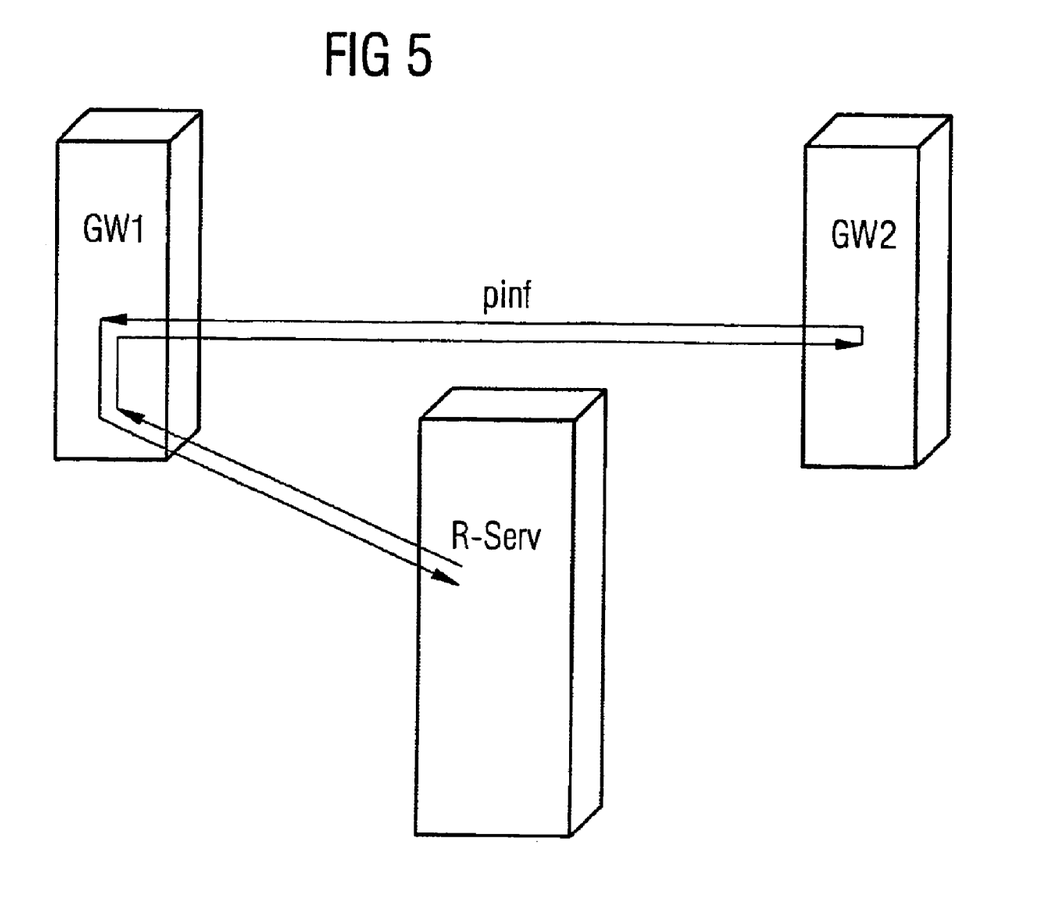
FIG. 5 shows a schematic diagram of the third inventive method.

FIGS. 3, 4 and 5 show the inventive methods one, two and three. The diagrams each show a resource server R-Serv with director and responder functionality as well as two gateways GW1 and GW2 with loopback functionality. The transmission paths of the test signal or the test sequence pinf (pinf: test information) is indicated by solid lines with arrows. In accordance with the first method the test information is transmitted from the first resource server R-Serv to the first gateway GW1 or to the second gateways GW2 and looped back again to the resource server R-Serv. In the second method (FIG. 4) the test information pinf is initially sent from the resource server R-Serv to the first gateway GW1, from there to the second gateway GW2 and finally back again to the resource server R-Serv. Test information pinf can also be transmitted in the opposite direction in order to check bidirectional transmission paths. Finally, in the third method (FIG. 5) the test information pinf is initially sent from the resource server R-Serv to the first gateway GW1, forwarded there to the second gateway GW2, looped back in the second gateway GW2 and finally transmitted back via the first gateway GW1 to the resource server R-Serv. Combination of the methods allows the transmission quality on all three part links, i.e. between the resource server R-Serv and the first gateway GW1, the first gateway GW1 and the second gateway GW2 and the second gateway GW2 and the resource server R-Serv to be checked.

The inventive methods can be implemented to check the quality of voice transmission in accordance with Standard ITU-T P.861 (Objective quality measurement of telephone-band (300 3400 Hz) speech codecs) or/and ITU-T P.862 (Perceptual evaluation of speech quality (PESQ), an objective method for END-to-END speech quality assessment of narrowband telephone networks and speech codecs). For testing the transmission quality virtual ports are defined for the resource server R-Serv and the gateways GW1 and GW2. These virtual ports determine the address information of the packets transmitted. The call processing program of the test ports is able to control the desired loopback or diversion functions of the gateways GW1 and GW2 or is in possession of knowledge that equivalent functionality based on an external loop is present in the form of a short circuited port or in the form of two virtual ports assigned to each other. This information is provided if necessary on administrative set up of the test ports.

Externally test jobs will be output to a packet-oriented switching system by the connection line test desks. In accordance with the test jobs the packet-oriented switching system successively through-switches the connections for testing using the methods shown in FIG. 3 to FIG. 5. A test can be ended in each case by release of the test connections by the resource server R-Serv, which can bring with it the automatic release of associated follow-up connections at ports of gateways GW1 and GW2 used for the method. Likewise on the release of the connection and the conclusion of the test the information of the connection line test desk can be used to initiate a possible next test step.

The test report is written by the resource server R-Serv, with the resource server R-Serv being in a position to create a fault localization statement and an urgency statement for countermeasures from the knowledge of the test job sequence. The connection line test desk has access to these outputs via a Web-based interface. The test steps to be executed can also be determined in detail via this interface. On starting the tests the desired test script can then be selected in each case via parameters using the Media Gateway Control Protocol controlling resource server R-Serv.

The invention further comprises a system in a packet network for performing a method for checking a transmission quality between a first gateway and a second gateway in a packet network which is effectively connected to at least one packet-based switching system, the method comprising:

performing first method steps, comprising:
setting up a connection between a resource server and the first gateway by the packet-based switching system;
transmitting test information via the connection to the first gateway from the resource server;
looping back the test information in the first gateway;
transmitting back the looped-back test information to the resource server; and
evaluating the looped-back test information with regard to criteria relating to the transmission quality;

performing second method steps, comprising:
setting up a connection between the resource server and the second gateway by the packet-based switching system;
transmitting test information via the connection to the second gateway from the resource server;
looping back the test information in the second gateway;
transmitting back the looped-back test information to the resource server; and
evaluating the looped-back test information with regard to criteria relating to the transmission quality;

performing third method steps, comprising:
transmitting test information from a director function arranged in the resource server via the first gateway and the second gateway to a responder function arranged in the resource server by setting up a connection between the resource server and the first gateway by the packet-based switching system, and by setting up a connection between the first gateway and the second gateway by the packet-based switching system, and by setting up a connection between the second gateway and the resource server by the packet-based switching system;
transmitting test information via the connections set up from the resource server to the first gateway, from the first gateway to the second gateway and from the second gateway to the resource server; and
evaluating the test information received with regard to criteria relating to the transmission quality; and
combining the results of the first, second, and third method steps for checking the transmission quality on the transmission section between the first gateway and the second gateway, the system comprising:
at least one packet-based switch;
at least one resource server having a director module and a responder module both adapted to perform the method; and
at least one gateway having a loopback functionality and adapted to perform the method.

The invention claimed is:

1. A method for checking a transmission quality between a first gateway and a second gateway in a packet network which is effectively connected to at least one packet-based switching system, the method comprising:

performing first method steps, comprising:
setting up a connection between a resource server and the first gateway by the packet-based switching system, the second gateway not included in the connection;
transmitting test information via the connection to the first gateway from the resource server;
looping back the test information in the first gateway;
transmitting back the looped-back test information to the resource server; and
evaluating the looped-back test information with regard to criteria relating to the transmission quality;

performing second method steps, comprising:
setting up a connection between the resource server and the second gateway by the packet-based switching system, the first gateway not included in the connection;
transmitting test information via the connection to the second gateway from the resource server;
looping back the test information in the second gateway;
transmitting back the looped-back test information to the resource server; and
evaluating the looped-back test information with regard to criteria relating to the transmission quality;

performing third method steps, comprising:
transmitting test information from a director function arranged in the resource server via the first gateway and the second gateway to a responder function arranged in the resource server by setting up a connection between the resource server and the first gateway by the packet-based switching system, and by setting up a connection between the first gateway and the second gateway by the packet-based switching system, and by setting up a connection between the second gateway and the resource server by the packet-based switching system;
transmitting test information via the connections set up from the resource server to the first gateway, from the first gateway to the second gateway and from the second gateway to the resource server; and
evaluating the test information received with regard to criteria relating to the transmission quality; and
combining the results of the first, second, and third method steps for checking the transmission quality on the transmission section between the first gateway and the second gateway.

2. The method in accordance with claim 1, wherein the direction function and/or responder function are provided on director or responder modules arranged in the resource server.

3. The method in accordance with claim 1, wherein the test information is evaluated in the resource server or in the packet-based switch.

4. The method in accordance with claim 1, wherein a test report is created.

5. The method in accordance with claim 1, wherein a bidirectional connection is established between the resource server and one of the gateways.

6. The method in accordance with claim 1, wherein voice quality is evaluated in accordance with the ITU-T Standards P.861 or P.862.

7. A method for checking the transmission quality between a first gateway and a second gateway in a packet network which is effectively connected to at least one packet-based switching system, the method comprising:
   performing first method steps, comprising:
      setting up a connection between a resource server and the first gateway by the packet-based switching system, the second gateway not included in the connection;
      transmitting test information via the connection to the first gateway from the resource server, the test information including test data, the test data including at least a tone, voice sample or video sample;
      looping back the test information in the first gateway;
      transmitting back the looped-back test data to the resource server; and
      evaluating the looped-back test information with regard to criteria relating to the transmission quality;
   performing second method steps, comprising:
      transmitting test information from a director function arranged in a resource server via the first gateway and the second gateway to a responder function arranged in the resource server by setting up a connection between the resource server and the first gateway by the packet-based switching system, and by setting up a connection between the first gateway and the second gateway by the packet-based switching system, the first gateway not included in the connection;
      transmitting the test information via the connections set up from the resource server to the first gateway, from the first gateway to the second gateway;
      looping back the test information in the second gateway; and
      transmitting the looped-back test information via the connections set up from the second gateway to the first gateway and then from the first gateway to the resource server, the test information including test data, the test data including at least a tone, voice sample or video sample and
      evaluating the received test data with regard to criteria relating to the transmission quality; and
   combining the results of the first and second method steps for checking the transmission quality on the transmission section between the first gateway and the second gateway.

8. The method in accordance with claim 7, wherein the direction function and/or responder function are provided on director or responder modules arranged in the resource server.

9. The method in accordance with claim 7, wherein the test information is evaluated in the resource server or in the packet-based switch.

10. The method in accordance with claim 7, wherein a test report is created.

11. The method in accordance with claim 7, wherein a bidirectional connection is established between the resource server and one of the gateways.

12. A resource server in a packet network, wherein the resource server can be controlled by a packet-based switch, the packet network including a first gateway and a second gateway, the resource server comprising:
   a director module; and
   a responder module, wherein the modules comprising mechanisms for performing transmission quality checks according to the following method:
   performing first method steps, comprising:
      setting up a connection between the resource server and the first gateway by the packet-based switching system, the second gateway not included in the connection;
      transmitting test information via the connection to the first gateway from the resource server;
      looping back the test information in the first gateway;
      transmitting back the looped-back test information to the resource server; and
      evaluating the looped-back test information with regard to criteria relating to the transmission quality;
   performing second method steps, comprising:
      setting up a connection between the resource server and the second gateway by the packet-based switching system, the first gateway not included in the connection;
      transmitting test information via the connection to the second gateway from the resource server;
      looping back the test information in the second gateway;
      transmitting back the looped-back test information to the resource server; and
      evaluating the looped-back test information with regard to criteria relating to the transmission quality;
   performing third method steps, comprising:
      transmitting test information from a director function arranged in the resource server via the first gateway and the second gateway to a responder function arranged in the resource server by setting up a connection between the resource server and the first gateway by the packet-based switching system, and by setting up a connection between the first gateway and the second gateway by the packet-based switching system; and by setting up a connection between the second gateway and the resource server by the packet-based switching system;
      transmitting test information via the connection set up from the resource server to the first gateway, from the first gateway to the second gateway and from the second gateway to the resource server; and
      evaluating the test information received with regard to criteria relating to the transmission quality; and
   combining the results of the first, second, and third method steps for checking the transmission quality on the transmission section between the first gateway and the second gateway.

13. The resource server in accordance with claim 12, further comprising an interface to a test station.

14. The resource server in accordance with claim 12, further comprising mechanisms for evaluating results of transmission quality checks.

15. The resource server in accordance with claim 12, wherein voice quality is evaluated by the resource server in accordance with the ITU-T Standards P.861 or P.862.

* * * * *